Patented Aug. 8, 1933

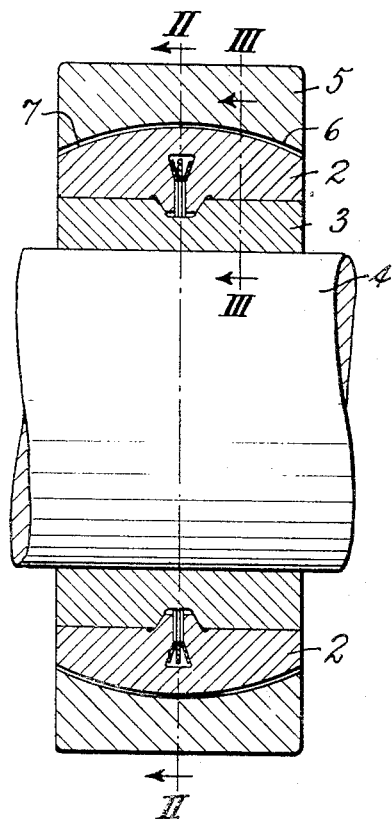
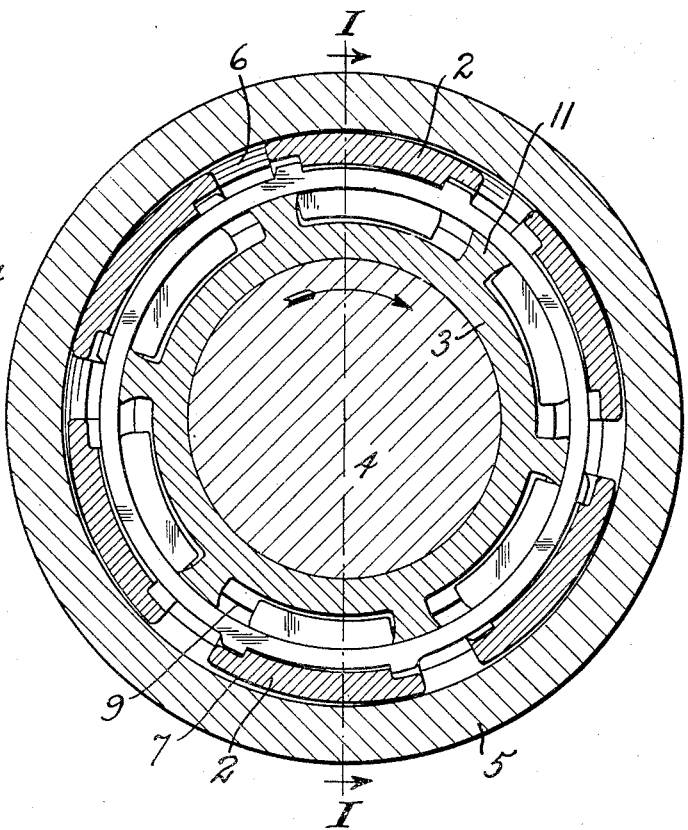
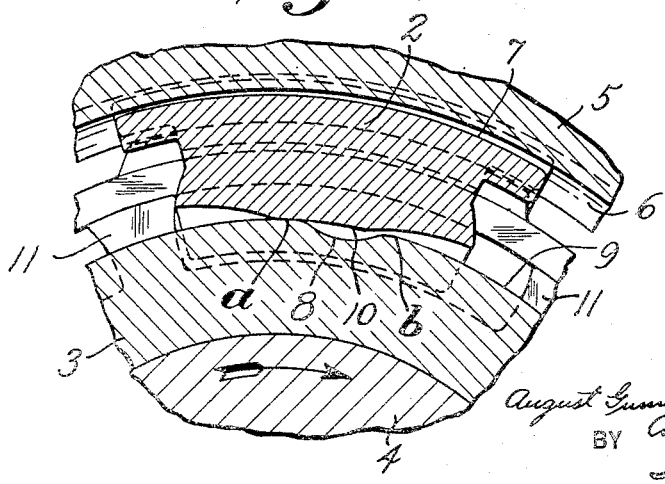

1,921,957

UNITED STATES PATENT OFFICE 1,921,957

BEARING

August Gunnar Ferdinand Wallgren and Carl Gustaf Janson, Stockholm, Sweden, assignors to Aktiebolaget Nomy, Stockholm, Sweden, a Corporation of Sweden Application October 18, 1932, Serial No. 638,308, and in Sweden November 25, 1930

5 Claims. (Cl. 308—73)

Our invention relates to bearings of the type employing a plurality of blocks. More particularly, our invention relates to radial bearings employing a plurality of tiltable blocks peripherally arranged about the axis of rotation, which blocks have operative positions providing wedge-shaped spaces between cooperating sliding surfaces, in which spaces load-sustaining lubrication films are produced. Still more particularly, our invention relates to the formation of curved sliding surfaces in block bearings. As one example of a bearing of this kind, reference may be had to Wallgren U. S. Pat. No. 1,871,485, granted August 16, 1932. The invention, however, is not limited to bearings of the construction disclosed in the aforesaid patent.

The invention will be described in conjunction with the accompanying drawing forming a part hereof and of which:

Fig. 1 is an axial sectional view of a bearing embodying the invention, taken on the line I—I of Fig. 2;

Fig. 2 is a transverse sectional view taken on the line II—II of Fig. 1; and

Fig. 3 is a cross-sectional view of a part of the bearing, taken on line III—III of Fig. 1 on enlarged scale.

The bearing comprises a plurality of bearing blocks 2 which are tiltably supported on a ring element or carrier 3, which may be termed a driving ring or driving member, and which is secured to the rotatable shaft 4. A race or outer member 5, constituting the stationary part or one of the stationary parts of the bearing, is provided with an inner spherical sliding surface 6 cooperating with outer sliding surfaces 7 of the blocks. The driving ring 3 is provided with axially extending grooves 8 (see Fig. 3) and cylindrical surfaces 9 which together with the grooves form bearing shoulders $a$ and $b$ for alternatively supporting the blocks depending upon the direction of rotation, the load being sustained through the surfaces 10 of the blocks and the shoulders $a$ or $b$. Also the driving ring is provided with projections 11 which permit and limit peripheral movement of the blocks in order that the blocks may move relative to the axial grooves so that they may be tilted.

In the direction of rotation indicated by the arrow in Figs. 2 and 3 the blocks adjust themselves to the positions shown in these figures. With reference to the direction of movement, the rearward part of the inner projection 10 of the block is raised onto the shoulder $a$ while the other part of the supporting surface 10 moves into the groove 8. Between the blocks and the bearing surface 6 the wedge-shaped spaces are thus formed in which, upon rotation, load-sustaining lubrication films are produced.

We believe that the best form of bearing embodying the invention should incorporate the improvements disclosed in the following applications, the disclosures of which may be considered as incorporated into this application: Janson Serial No. 479,621, filed September 4, 1930; Wallgren Serial No. 544,767, filed June 16, 1931; Wallgren Serial No. 591,467, filed February 8, 1932; and Wallgren Serial No. 612,447, filed May 20, 1932.

In order to obtain proper functioning of bearings of the above described type it is necessary, as in the case of cylindrical sliding bearings, to have a certain amount of play between the stationary and rotating sliding surfaces of the bearing, in this case between the stationary sliding surface 6 and the rotating sliding surfaces 7. With block bearings this play has previously been provided for in two different ways, namely:

(1) The spherical surface or surfaces which constitute the rotating sliding surfaces of the bearing have been made with a smaller radius than the stationary sliding surface to the extent corresponding to the desired play.

(2) The blocks, having the sliding surfaces thereon, have been made with the same radius of sliding surface as the stationary sliding surface, the blocks being supported inwardly of the stationary sliding surface at such distance from the stationary sliding surface (and the axis of rotation) that the desired play has been obtained between the sliding surfaces.

In the first case, the sliding surfaces are concentric. In operation, however, the surfaces do not remain concentric since the rotating parts move toward and bear against the stationary part. Thus it will be seen that when the bearing is not rotating, the load will be carried substantially entirely on the middle parts of the blocks which are in contact with the stationary sliding surface. That is, the load will be carried through surfaces which are in contact at substantially only one point. The play increases outwardly toward the sides of the bearing, that is, in axial direction. This may be a distinct disadvantage, particularly with relatively wide bearings and with bearings having relatively great radial play, as with bearings intended to be driven with heavy lubricants, since the oil has a tendency to flow outwardly in axial direction from the wedge-shaped spaces between the sliding surfaces. We have found this disadvantage to be present particularly at the starting of the bearing before the load-sustaining oil films are as yet set up due to the load in such case being concentrated upon the small bearing surface.

In order to eliminate this disadvantage it has been suggested that the bearing be constructed in accordance with the second case above set forth. In accordance with this proposition, when the bearing is not rotating, a large load-sustaining bearing surface is present between the sliding surfaces, and this facilitates starting. Due to the equality of radii of the surfaces, however, a disadvantage arises in that the extensive contacting surfaces provide adhesion forces of such magnitude that the blocks adhere to the stationary sliding surface when passing through the unloaded zone of the bearing, that is, at the time when they should have freedom to adjust themselves with respect to the driving ring. This may cause shocks between the blocks and their supporting surfaces when they again enter into the loaded zone of the bearing and again are forced to bear against the supporting surfaces. Such shocks may cause an undesired noise and may even cause deformation of the supporting surfaces.

The above outlined disadvantages of previous forms are eliminated by the present invention. According to the present invention, the desired play is obtained by a combination of Case 1 above and Case 2. It may be said to be characteristic of the invention that the radius of the surface of the block is different from the radius of the stationary sliding surface of the bearing, but not so as to provide concentric relation, the difference in radii of the spherical surfaces being less than the play, that is, the minimum distance between the sliding surfaces, when the blocks are evenly distributed peripherally of the bearing with the blocks in their midpositions, that is with the block surfaces 10 contacting both the shoulders $a$ and $b$ and with the parts centered. Thus, in accordance with the invention the bearing differs from Case 1 in that the surfaces are not concentric when so disposed and the bearing differs from Case 2 in that the spherical surfaces are not of the same radius. Putting it in other words, the block surfaces and stationary surface are of different radii, but the blocks are held further out than would permit a concentric relation.

Thus, having given the conditions of forming the spherical surfaces it will be clear that they can be formed by the mode and equipment disclosed in application Serial No. 387,781 of Wallgren, filed August 22, 1929.

Preferably, the difference between the radii of the spherical surfaces is equal to one-half the play or minimum distance between the spherical surfaces.

Instead of arranging the blocks on a ring element secured to the journal shaft as in the embodiment shown, they may be placed directly on the journal shaft which can be formed similarly to the driving element.

The invention is not limited to the embodiment shown. Furthermore, it will be apparent that the invention can be applied to bearings having the blocks stationary.

What we claim is:

1. A radial bearing comprising an inner member, an outer member spaced radially from the inner member, a plurality of bearing blocks having operative positions between said members, said inner member and said blocks having adjacent cooperating irregular surfaces for causing rotation in one direction to tilt the blocks one way and rotation in the other direction to tilt the blocks the other way, and said outer member and said blocks having adjacent cooperating spherical bearing surfaces, the radii of the spheres of the sliding surfaces of the blocks being the same for the various blocks and being less than the radius of the sphere of the sliding surface of the outer member, the difference in radii being less than the minimum distance between the blocks and said outer member with the blocks evenly distributed peripherally and in contact with said block member and with the parts centered, and means for permitting and limiting shift of position between said blocks and said outer member.

2. A radial bearing comprising stationary and rotary members and a plurality of bearing blocks having operative positions radially between said members, one of said members and said blocks having adjacent cooperating surfaces acting to tilt the blocks on rotation and prevent relative axial displacement and the other member and said blocks having adjacent cooperating spherical surfaces, the spherical surfaces of the blocks having a given radius, the spherical surface of said other member having a different given radius, the difference between said given radii being less than the minimum distance between the respective spherical surfaces with the blocks evenly distributed peripherally and in contact with said one of said members and with the parts centered.

3. In a bearing comprising a plurality of bearing members and a plurality of blocks between said members, one of said members and said blocks having tilting surfaces, and the other of said members and said blocks having cooperating spherical sliding surfaces, the radius of the sliding surface of the blocks differing from the radius of the sliding surface of the bearing member by an amount less than the radial play between the surfaces with the blocks evenly distributed about the bearing and contacting said one of said members and with the parts centered.

4. In a bearing comprising a plurality of bearing members and a plurality of bearing blocks between said members, one of said members and said blocks having tilting surfaces, and the other of said members and said blocks having cooperating spherical sliding surfaces, the radius of the sliding surface of the blocks differing from the radius of the sliding surface of the bearing by an amount equal to one-half the radial play between the surfaces with the blocks evenly distributed above the bearing and contacting said one of said members and with the parts centered.

5. A radial bearing comprising an inner member, an outer member spaced radially from the inner member, a plurality of bearing blocks having operative positions between said members, said inner member and said blocks having adjacent cooperating irregular surfaces for causing rotation in one direction to tilt the blocks one way and rotation in the other direction to tilt the blocks the other way, and said outer member and said blocks having adjacent cooperating spherical bearing surfaces, the radii of the spheres of the sliding surfaces of the blocks being the same for the various blocks and being less than the radius of the spheres of the sliding surface of the outer member, the difference in radii being equal to one-half the minimum distance between the blocks and said outer member with the blocks evenly distributed peripherally and in contact with said inner member and with the parts centered, and means for permitting and limiting shift of position between said blocks and said outer member.

AUGUST GUNNAR FERDINAND WALLGREN.
CARL GUSTAF JANSON.